Oct. 22, 1935.  W. LUXMORE  2,018,141
DRINK MIXER
Filed Oct. 29, 1932  3 Sheets-Sheet 1
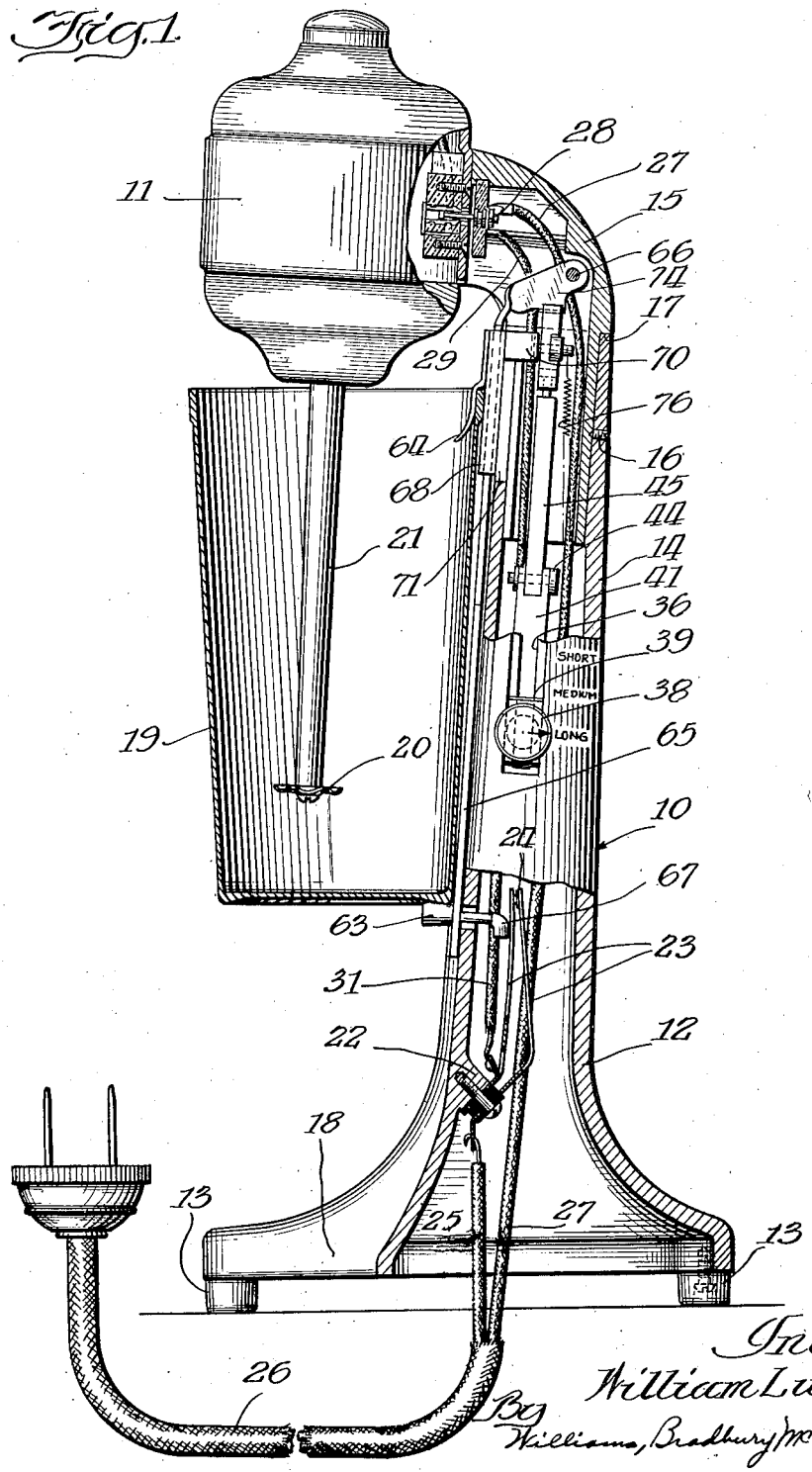
Inventor:
William Luxmore Oct. 22, 1935.   W. LUXMORE   2,018,141
DRINK MIXER
Filed Oct. 29, 1932   3 Sheets-Sheet 2
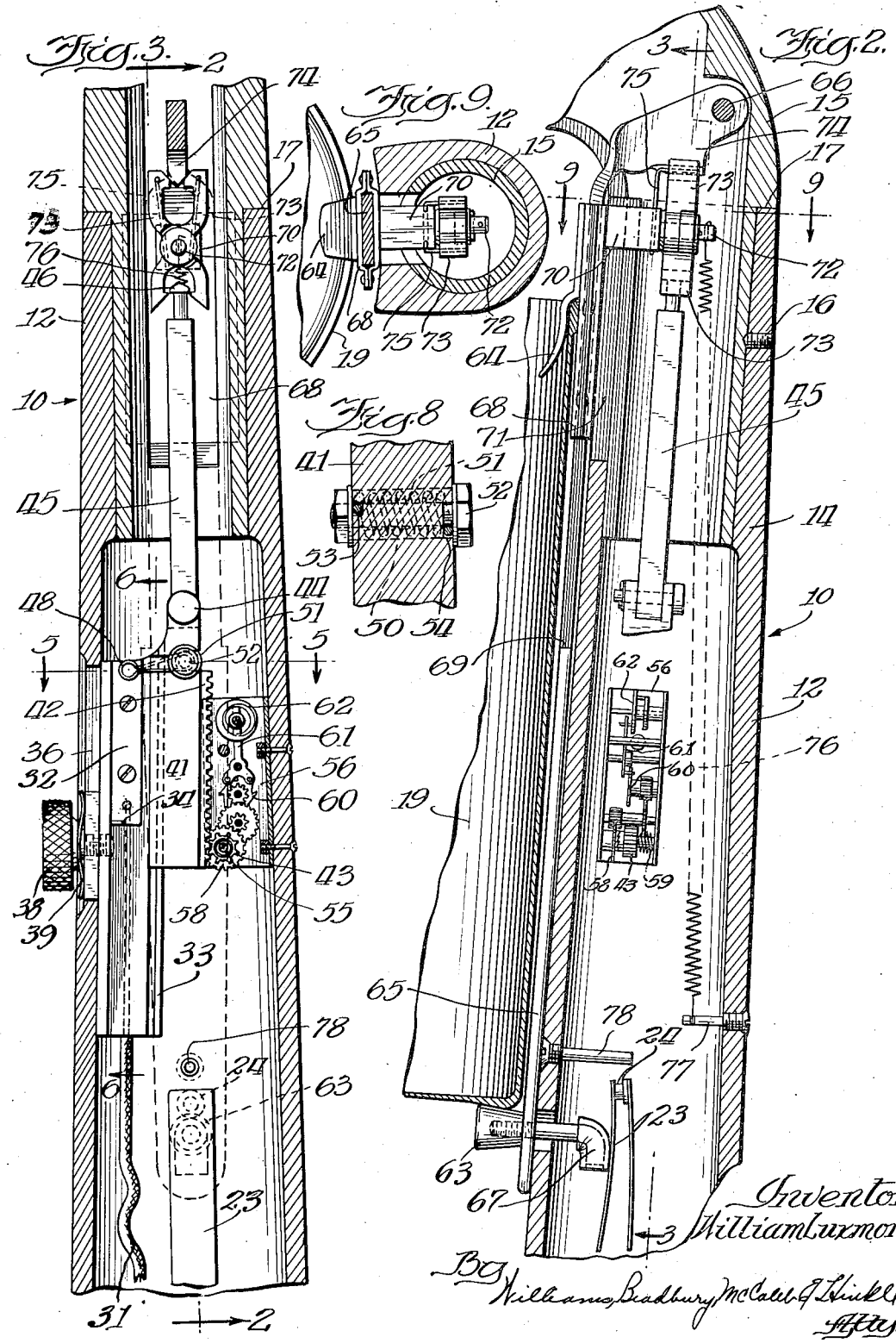
Inventor
William Luxmore

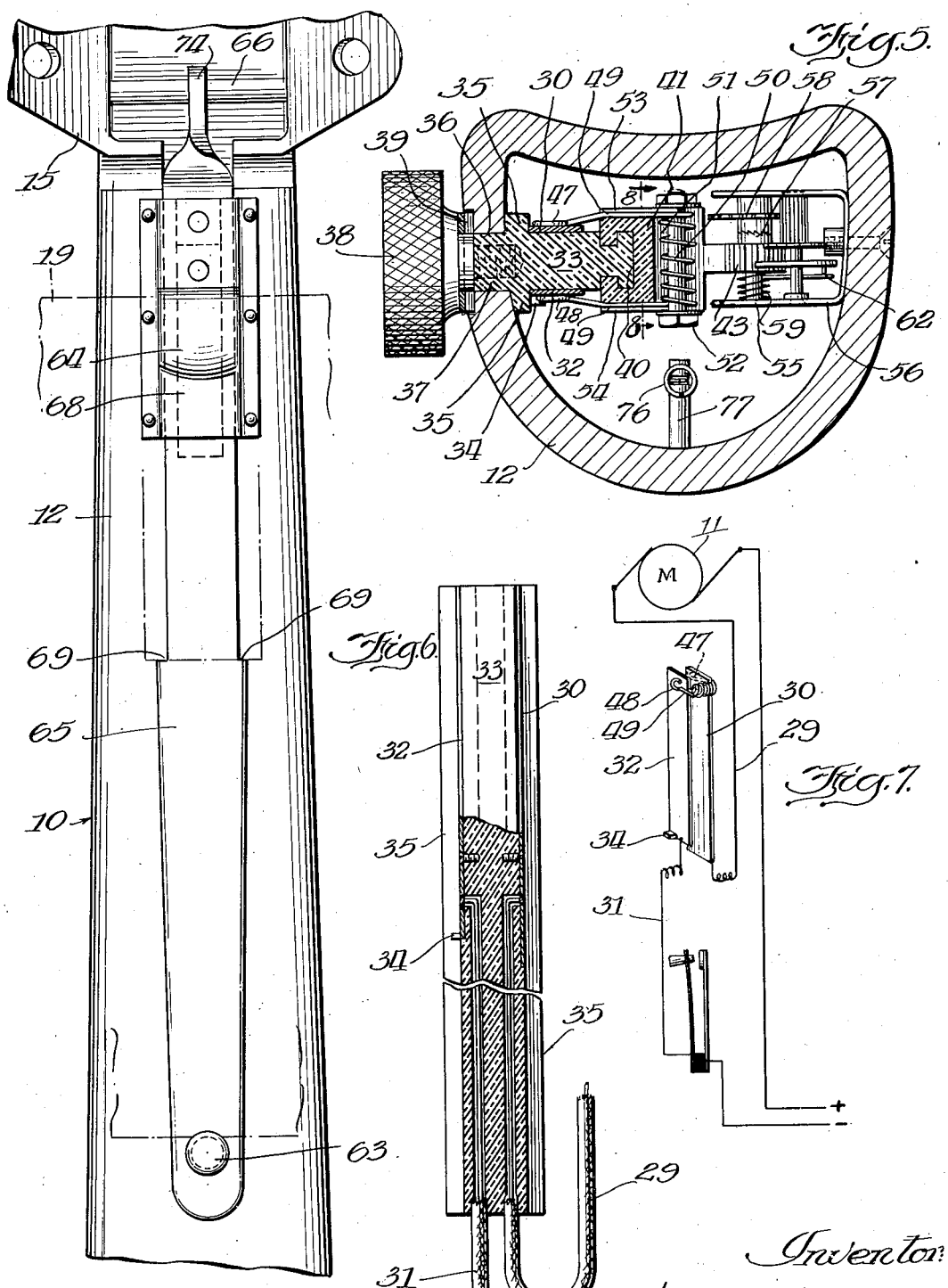

Patented Oct. 22, 1935

2,018,141

UNITED STATES PATENT OFFICE 2,018,141

DRINK MIXER

William Luxmore, Chicago, Ill., assignor of one-half to Albert G. McCaleb, Evanston, Ill.

Application October 29, 1932, Serial No. 640,284

11 Claims. (Cl. 259—108)

This invention relates to a drink mixer in which a motor driven stirrer is provided for the purpose of agitating the ingredients of a drink to blend same together.

One of the objects of the present invention is to provide an improved drink mixer.

A further object of the invention is to provide a mixer in which the duration of the stirring or agitation is automatically controlled and terminated.

A further object of the invention is to provide a mixer of this type in which the duration of the stirring or agitation can be readily controlled.

A further object of the invention is to provide a drink mixer of this type in which the time control is adapted to be set by the placing of the cup upon the mixer.

A further object of the invention is to provide a timed mixer adapted to be put in operation by the mounting of the cup upon the mixer.

Other objects, advantages and capabilities of the invention will appear from the following description of a preferred embodiment thereof, taken in conjunction with the accompanying drawings, in which Figure 1 is a side elevation of the mixer with the cup applied thereto, the cup and part of the mixer being shown in section;

Fig. 2 is a fragmentary vertical section of the mixer column, shown on a larger scale, the section being taken on the line 2—2 of Fig. 3;

Fig. 3 is a similar view, the line of section being taken on the line 3—3 of Fig. 2;

Fig. 4 is a fragmentary front elevation of the mixer column showing the elements thereof which engage the cup;

Fig. 5 is a cross-sectional view, on a larger scale, and taken on the line 5—5 of Fig. 3;

Fig. 6 is a detail view partly in section, taken on the line 6—6 of Fig. 3;

Fig. 7 is a wiring diagram of the mixer;

Fig. 8 is a sectional detail view taken on the line 8—8 of Fig. 5, and

Fig. 9 is a sectional view taken on the line 9—9 of Fig. 2.

Referring to the drawings, the mixer comprises a stand or support 10 which rigidly carries a motor 11. The stand 10 may comprise a casting 12 which is hollow and is flared at its lower end to provide a suitable base. The mixer may stand on a plurality of feet 13 of rubber or other suitable material. The upper part of the casing 12 is in the form of a hollow column 14 which slopes rearwardly slightly in order to bring the motor 11 into satisfactory position above the base to provide for stability.

The upper end of the column 14 telescopically receives a portion of a gooseneck 15 on which the motor 11 is mounted. The gooseneck 15 is secured rigidly to the column 14 by means of screws 16 or their equivalent. As shown in Fig. 1, the gooseneck 15 may be provided with a shoulder 17 which rests on the upper end of the column 14. As best shown at 18 in Fig. 1, the front portion of the base of the casing 12 is hollowed so as to facilitate the introduction of the cup 19 into cooperative relation with the stirrer element 20 carried by the stirrer shaft 21 which is connected to the armature of the motor. The manner in which the cup is maintained in this position will hereinafter be described.

The interior of the casing 12 is provided with a boss 22 upon which is mounted a pair of spring arms 23 which carry at their outer ends contact points 24. The spring arms 23 are mounted on the boss 22 with the aid of suitable insulating members so as to insulate them from each other and from the casing 12. The resiliency of the arms 23 causes them to tend to diverge so as to maintain the contacts 24 out of contact with each other. One of the arms 23 is connected to a conductor 25 of a cable 26 which is adapted to be plugged into a suitable power outlet. The other conductor 27 of the cable 26 passes up through the column 14 and the gooseneck 15 and is connected to one of the terminals 28 of the motor 11. The other terminal of the motor 11 is connected by a conductor 29 to a plate 30 and the other resilient arm 23 is connected by a conductor 31 to a similar plate 32.

The plates 30 and 32 are mounted on either side of a vertical bar 33 of insulating material and preferably at the upper part thereof as shown in Fig. 6. The plates 30 and 32 are preferably flush with surfaces of the bar 33 which extends therebelow. The plates 30 and 32 may suitably be secured to the bar 33 by means of screws and the conductors 29 and 31 may extend upwardly through vertical openings in the bar 33 and then through short horizontal openings into contact with the plates 30 and 32, to which they may be soldered or otherwise secured in a manner to insure effective electric contact. At its lower end the plate 32 carries an outwardly directed projection 34, the purpose of which will hereinafter be described.

The bar 33 is provided on each side with flanges 35 which are adapted to bear upon the inside wall of the column 14 on either side of a slot 36 provided therein. This slot extends longitudinally of the column 14 and is of suitable length to provide adjustment of the bar 33 sufficient to give the desired range of timing. The bar 33 carries an elongated portion 37 which fits into the slot 36. This elongated portion 37 is drilled and tapped to receive the threaded stem of a knurled nut 38. The outer face of the column 14 adjacent the slot 36, is recessed as shown in Fig. 5 in order to provide a seat for an elongated spring 39 provided with an opening through which the stem of the nut 38 extends. It will readily be understood that when the nut 38 is unscrewed somewhat, the bar 33 may be moved longitudinally into any desired position within its range of adjustment and that it may be securely maintained in such adjusted position by merely tightening the nut 38.

Adjacent its inner face the sides of the bar 33 are recessed to provide a T guide which is adapted to cooperate with a T slot 40 in a bar 41, enabling the bar 41 to slide along the bar 33. The bar 41 carries on its face opposite to the T slot 40, a rack 42 which is adapted to cooperate with a pinion 43 which will hereinafter be referred to. The bar 41 may suitably be of insulating material, the upper end of which is rigidly connected, by a joint 44 to a rod 45 which rod extends upwardly and is provided at its upper end with a head 46. The bar 41 provides a mounting for contacts 47 and 48 which are connected together and which are adapted to bear upon the plates 30 and 32 respectively. The contacts 47 and 48 may suitably be formed from a piece of resilient wire, the outer ends of which are adapted to bear upon the plates 30 and 32. These ends are connected by lengths 49, both of which are connected to a coil springy portion 50. The coil 50 is adapted to be received in a slot 51 in the bar 41 at the upper end of the rack 42. A bolt 52 extends through the coil 50 and, being tightened up against the faces of the bar 41, holds the coil 50 against removal. The side faces of the bar 41 are provided with slots 53 and 54 for the reception of the lengths 49. The slot 53 is sufficiently large to receive the length 49 connecting to the contact 47 and to hold this length against movement in the vertical plane. The slot 54 is relatively wide and permits movement of the length 49 which it contains in the vertical plane. Consequently, when the bar 41 descends so as to bring the contact 48 to the lower end of the plate 32, the contact 48 hits against the projection 34 and is detained thereby until it is able to move past the projection with a sharp flick, insuring quick break of the motor circuit.

Pinion 43 is slidably mounted upon a shaft 55 carried by a frame 56 mounted on the inside of the column 14 opposite the slot 36. The hub of the pinion 43 carries ratchet teeth 57 which are adapted to engage corresponding ratchet teeth on the hub of a gear wheel 58. A spring 59 forces the pinion 43 towards the gear wheel 58 so as to tend to hold the ratchet teeth in mesh. The ratchet teeth are so directed that power supplied by the descent of the bar 41 and associated parts, is communicated through pinion 43 and the ratchet teeth to the gear wheel 58. When, however, the bar 41 is elevated the ratchet teeth permit the pinion 43 to rotate in the opposite direction without communicating movement to the gear wheel 58. The gear wheel 58 forms one of a train which terminates in an escapement wheel 60. The escapement wheel 60 is adapted to cooperate with a pallet lever 61 which actuates a balance wheel 62 in well known manner. It will be understood that when the bar 41 and associated parts are allowed to fall, the escapement mechanism begins to operate and impedes the descent of these elements and causes them to descend at a predetermined speed. The position of the plates 30 and 32 can be controlled by actuation of the knurled nut 38 so as to give stirring or agitating periods of desired length. When the nut 38 is in a low position the stirring period is relatively long. In the uppermost position of the nut 38, the duration of stirring is relatively short. Intermediate positions give periods of stirring of intermediate length.

The cup 19 is supported in operative position by the engagement of its base with a stud 63 and the engagement of the lip of the cup by a clip 64 which extends into the cup slightly. The stud 63 is supported by a lever 65 which extends through an opening in the front of the gooseneck 15 and is pivotally mounted upon a pin 66 mounted in said gooseneck. Rearwardly of the stud 63 the lever 65 carries a stud 67, which may suitably be of insulating material, which stud extends inwardly through an opening in the wall of the column 14 into the interior thereof so as to engage the proximate resilient arm 23 and bring the points 24 into contact when the cup 19 is mounted in operative position. When the cup is removed the resilience of the arms 23 is sufficient to move the lever 65 outwardly and disconnect the points 24. The clip 64 projects from the outer face of a tubular carriage 68 which is adapted to slide upon the upper portion of the lever 65. The lever 65 is shouldered as shown at 69, in order to limit the downward movement of the carriage 68. The carriage 68 comprises a head 70 which projects inwardly into the column 14 through a slot 71 at the upper end thereof. The head 70 carries a rearwardly projecting pin 72 which serves as a pivot for crossed arms 73, the lower ends of which are provided with sloping faces which diverge outwardly and are adapted to be spread by coming into contact with the head 46 of the rod 45. This head is provided with downwardly directed shoulders, and the arms 73 are provided with complementary hook elements which are adapted to engage said shoulders.

The upper ends of the arms 73 are provided with sloping upwardly divergent faces which are adapted to engage a downward projection 74 of the lever 65 when the carriage 68 is moved upwardly so as to spread the ends of the arms 73 apart. A spring 75 is provided having ends which project into the upper ends of the arms 73, its intermediate portion forming a loop which extends downwardly into the head 70. A spring 76, which is relatively long and relatively weak, is connected to the rear end of the pin 72 and to a stud 77 mounted at a low point within the column 14, and tends to move the carriage 68 downwardly when the absence of the cup 19 permits. A pin 78, projecting inwardly within the column 14, serves as a stop limiting the downward movement of the bar 41 and associated parts.

The operation of the device is as follows. In the non-operating state of the mixer, the sliding frame 68 is at its lowest position, the head 70 being located near the bottom of the slot 71. The points 24 are out of contact and the lever 65 is in a position somewhat outward of that shown in Figs. 1 and 2. The bar 41 rests upon the pin 78 and the contacts 47 and 48 are below the plates 30 and 32. The arms 73 are at their lowest position and the hooked lower ends are in engagement with the head 46 of the rod 45.

The timing is set for the desired duration of stirring or agitation, this being effected by loosening the knurled nut 38 and sliding it upwardly or downwardly, as the case may be. This adjustment determines the location of the bar 33 and in particular it determines the position of the lower edges of the plates 30 and 32 which, in turn, determines the point at which the motor circuit is broken. The ingredients of the drink are placed in the cup 19 and the cup is then placed in position, that is the cup is moved under the stirrer 20 and is slipped upwardly towards the position of the cup shown in Fig. 1. The edge of the cup is slipped under the clip 64 and the upward movement of the cup raises the carriage 68 into the position shown in Fig. 1. The upward movement of the carriage 68 carries with it the crossed arms 73 and consequently, the bar 41. During the upward movement of the bar 41, the pinion 43 rotates freely with respect to the gear wheel 58, the engaging ratchets slipping over one another during movement in this direction. When the cup is allowed to rest on the stud 63 the lever 65 is moved inwardly towards the column 14 and the points 24 are brought into contact. The motor circuit is now complete through conductor 25, arms 23, conductor 31, plate 32, contacts 48 and 47, plate 30, conductor 29 and conductor 27 so that the motor starts operating, actuating the stirrer 29 in the usual manner. During the last part of the upward movement of the carriage 68, the upper ends of the arms 73 come into contact with the depending portion 74 of the lever 65 which has the effect of spreading the arms 73 and allowing the bar 41 and associated parts to slide downwardly at a slow rate which is controlled by the balance wheel 62. During this downward movement, the contacts 47 and 48 are drawn over the surfaces of the plates 30 and 32. The plate 30 projects somewhat lower than the plate 32 and the first break is made between the contact 48 and the latter plate. When the contact 48 approaches the lower end of the plate 32 it engages the projection 34 and is held thereby for a short time while the downward movement of the bar 41 continues.

When the arm 49 carrying the contact 48 is flexed sufficiently, the slot 54 in the side of the bar 41 providing for this flexure, the contact 48 suddenly passes away from the projection 34 and the circuit is immediately broken. The breaking of the circuit causes the motor to stop.

When the cup is removed the carriage 68 slides downwardly on the lever 65 until the lower ends of the arms 73 come into contact with the head 46 of the rod 45. The weight of the carriage and the tension of the spring 76 are sufficient to cause the arms to open to permit the lower hooked ends to engage the head 46. The device is now returned to initial non-operating condition and it may be started again by inserting the same or another cup in the manner described above.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A drink mixer comprising a standard, an electric motor mounted on the standard, a depending agitator driven by the motor, a cup support on the standard for retaining the cup around the agitator when manipulated into such position, time-keeping mechanism carried by the standard, circuit controlling devices actuated by the time-keeping mechanism to open the motor circuit following a predetermined time interval after the time-keeping mechanism is placed in operation, a member which is engaged by the cup, when the latter is being manipulated into position around the agitator, for placing the time-keeping mechanism in operation, and additional circuit controlling devices for insuring that the motor circuit is not completed until after the deposit of the cup on its support.

2. A drink mixer comprising a standard, an electric motor mounted on the standard, a depending agitator driven by the motor, a cup support on the standard for retaining the cup around the agitator and against movement relative to the standard when the cup is manipulated into such position around the agitator, time-keeping mechanism carried by the standard, circuit controlling devices actuated by the time-keeping mechanism to open the motor circuit following a predetermined time interval after the time-keeping mechanism is placed in operation, and a member which is engaged by the cup, when the latter is being manipulated into position around the agitator, for placing the time-keeping mechanism in operation, said time-keeping mechanism comprising a weight, vertically movable with respect to the standard, said weight being lifted to an elevated position by manipulation of the cup into position around the agitator, and devices for regulating the descent rate of such weight.

3. A drink mixer comprising a standard, an electric motor mounted on the standard, a depending agitator driven by the motor, a cup support on the standard for retaining a cup around the agitator when manipulated into that position, time-keeping mechanism carried by the standard, circuit controlling devices actuated by the time-keeping mechanism to open the motor circuit following a predetermined time interval after the time-keeping mechanism is placed in operation, and a member which is engaged by the cup, when the latter is being manipulated into position around the agitator, for placing the time-keeping mechanism in operation, said time-keeping mechanism comprising a weight vertically movable with respect to the standard, said weight being lifted to an elevated position by manipulation of the cup into position around the agitator, and devices for regulating the descent rate of said weight, said last mentioned devices comprising a rack carried by the weight, a pinion meshing with said rack, said pinion being journalled on means fixed with respect to the standard, and escapement devices for determining the rate at which the teeth of the pinion may engage the teeth of the rack during the descent of said weight.

4. A drink mixer comprising a standard, a motor carried by the standard, an agitator driven by the motor and supported from above, a cup for manual manipulation from beneath the agitator into a position around said agitator, instrumentalities carried by the standard for engaging and supporting the cup in said position around the agitator and against vertical movement relative to either agitator or standard during the mixing operation, means for closing the motor circuit when the cup has been manipulated into said position around the agitator, time-keeping mechanism carried by the standard, circuit controlling devices actuated by said time-keeping mechanism to open the motor circuit at the end of a predetermined time interval following initiation of the operation of said time-keeping mechanism, and a member, engaged and actuated by the cup while the latter is being manipulated into position around the agitator, for initiating the operation of the time-keeping mechanism.

5. A drink mixer comprising a stationary support, a motor carried by said support, a depending agitator driven by the motor and supported from above, a cup adapted to be manipulated from beneath the agitator into a position around said agitator, means carried by the support adapted stationarily to retain the cup in said position around the agitator, circuit controlling means arranged to close the motor circuit when the cup has been manipulated into said position around the agitator, a weight vertically movable with respect to said support, a weight lifting member arranged and adapted to be engaged and actuated by the cup to lift said weight while the cup is being manipulated into the aforesaid position around the agitator, means for releasing the weight from its lifting member when the cup has been manipulated into position around the agitator, means for regulating the descent rate of said weight, and contacts controlled by said weight for opening the motor circuit at a predetermined point in the descent of said weight.

6. A drink mixer comprising a standard, a motor carried by the standard, an agitator driven by the motor and supported from above, a cup for manipulation from beneath the agitator into a position around the agitator, devices carried by the standard for stationarily supporting the cup around the agitator, circuit controlling devices for closing the motor circuit when the cup is supported in its aforesaid position around the agitator, time-keeping mechanism associated with the standard comprising a weight adapted to rise and fall relatively to said standard, escapement mechanism controlling the falling rate of said weight, means engaged by the cup for lifting said weight as the cup is manipulated into its position around the agitator, means for releasing the weight from its lifting means when the cup has been placed into position around the agitator, and circuit controlling devices actuated by said weight and adapted to open the motor circuit at a predetermined point in the descent of said weight.

7. A drink mixer comprising a standard, a motor carried by the standard, an agitator driven by the motor and supported from above, a cup for manipulation from beneath the agitator into a position around the agitator, devices carried by the standard for stationarily supporting the cup around the agitator, circuit controlling devices for closing the motor circuit when the cup is supported in its aforesaid position around the agitator, time-keeping mechanism associated with the standard comprising a weight adapted to rise and fall relatively to said standard, escapement mechanism controlling the falling rate of said weight, means engaged by the cup for lifting said weight as the cup is manipulated into its position around the agitator, means for releasing the weight from its lifting means when the cup has been placed into position around the agitator, cooperating contact means carried by the weight and the standard, said cooperating contact means for closing the motor circuit when the agitator is operating, said contact means being adapted to separate to open the motor circuit at a predetermined point in the descent of said weight, and means for varying the height of the standard carrying one of said cooperating contact means to vary the operating period of the mixer.

8. A drink mixer comprising a standard, a motor carried by the standard, an agitator driven by the motor and supported from above, a cup for manipulation from beneath the agitator into a position around the agitator, means carried by the standard for stationarily supporting the cup around the agitator, circuit controlling devices for closing the motor circuit when the cup is supported in its aforesaid position around the agitator, time-keeping mechanism associated with said standard arranged and adapted to open the motor circuit at the end of a predetermined time interval following the initiation of the operation of said time-keeping mechanism, said time-keeping mechanism comprising a weight adapted to rise and fall relatively to said standard, means controlling the falling rate of said weight, a slide on the standard adapted to be engaged and moved upwardly by the cup when the latter is manipulated into its position around the agitator, a weight lifter carried by the slide and adapted to engage the weight when the slide and weight are in lowered positions, and means for releasing the weight from the weight lifter, to initiate the operation of the time-keeping mechanism, when the cup has been manipulated into position around the agitator.

9. A drink mixer comprising a standard, a motor carried by the standard, an agitator driven by the motor and supported from above, a cup adapted to be manually manipulated into a position around the agitator, cup supporting devices carried by the standard arranged stationarily to hold the cup in its position around the agitator, time-keeping mechanism disposed within the standard, said time-keeping mechanism comprising a weight adapted to rise and fall within the standard, devices for regulating the descent rate of said weight, a slide carried by the standard and constituting one of the cup supporting devices, said slide being vertically movable on the standard and being engaged to be moved by the cup while the latter is being manipulated into its position around the agitator, a weight lifter carried by the slide and arranged to engage the weight when the slide and weight are in lowered positions, means for releasing the weight from its lifter when said slide has been moved to an elevated position by means of the cup, circuit controlling devices actuated by the weight arranged and adapted to open the motor circuit at a predetermined point in the descent of said weight, and means for varying the point in the descent of said weight at which such last mentioned circuit controlling devices are actuated.

10. A drink mixer comprising a stationary support, a motor stationarily carried by the support, an agitator driven by the motor and depending therefrom, a container adapted for manual manipulation into position around the agitator, supporting means on the standard whereby said container is engaged and stationarily carried on the support and held against vertical movement relative to the agitator throughout the operation of the motor and its agitator, means closing the motor circuit when the container is thus stationarily supported around the agitator, time-keepently of the container and motor, arranged and adapted to open the motor circuit at the end of a predetermined time interval following initiation of the operation of said time-keeping mechanism, and devices, automatically actuated upon placement of the cup into its position around the agitator, arranged and adapted to initiate the operation of the said time-keeping mechanism.

11. A drink mixer comprising a standard, an electric motor mounted on the standard, an agitator driven by and depending from the motor, means on the standard for retaining a cup around the agitator when manipulated into position around the agitator, circuit controlling devices arranged to close the motor circuit when the cup has been manipulated into the aforesaid position around the agitator, time-keeping mechanism, carried by the standard and operating independently of the motor speed, arranged and adapted to open the motor circuit at the end of a predetermined time interval after the operation of said time-keeping mechanism has been initiated, and a member engaged by the cup, while the cup is being manipulated into the aforesaid position around the agitator, for storing energy in said time-keeping mechanism and for initiating the operation of said time-keeping mechanism when the cup has been placed in its aforesaid position around the agitator.

WILLIAM LUXMORE.